United States Patent

Dietz

[15] 3,638,067

[45] Jan. 25, 1972

[54] TRIGGERING CIRCUIT FOR CRT DEFLECTION SYSTEM UTILIZING AN SCR

[72] Inventor: Wolfgang Friedrich Wilhelm Dietz, New Hope, Pa.

[73] Assignee: RCA Corporation

[22] Filed: Aug. 25, 1969

[21] Appl. No.: 852,673

[52] U.S. Cl. ......................................................315/27 TD
[51] Int. Cl. ......................................................H01j 29/70
[58] Field of Search ..................................315/27 F, 27 TD

[56] References Cited

UNITED STATES PATENTS 3,436,591 4/1969 Grundmann..........................315/27

3,434,003 3/1969 Geller..................................315/27

*Primary Examiner*—Rodney D. Bennett, Jr.
*Assistant Examiner*—J. M. Potenza
*Attorney*—Eugene M. Whitacre

[57] ABSTRACT

In a television receiver employing a two SCR horizontal deflection circuit, a triggering waveform recurring at the horizontal or line deflecting rate is applied to a series resonant circuit having differentiating means coupled to the junction of the series resonant elements to provide gate signal to turn the trace SCR on and assist in turning it off during each horizontal deflection cycle.

10 Claims, 2 Drawing Figures

PATENTED JAN 25 1972

3,638,067

Figures 1, 2:
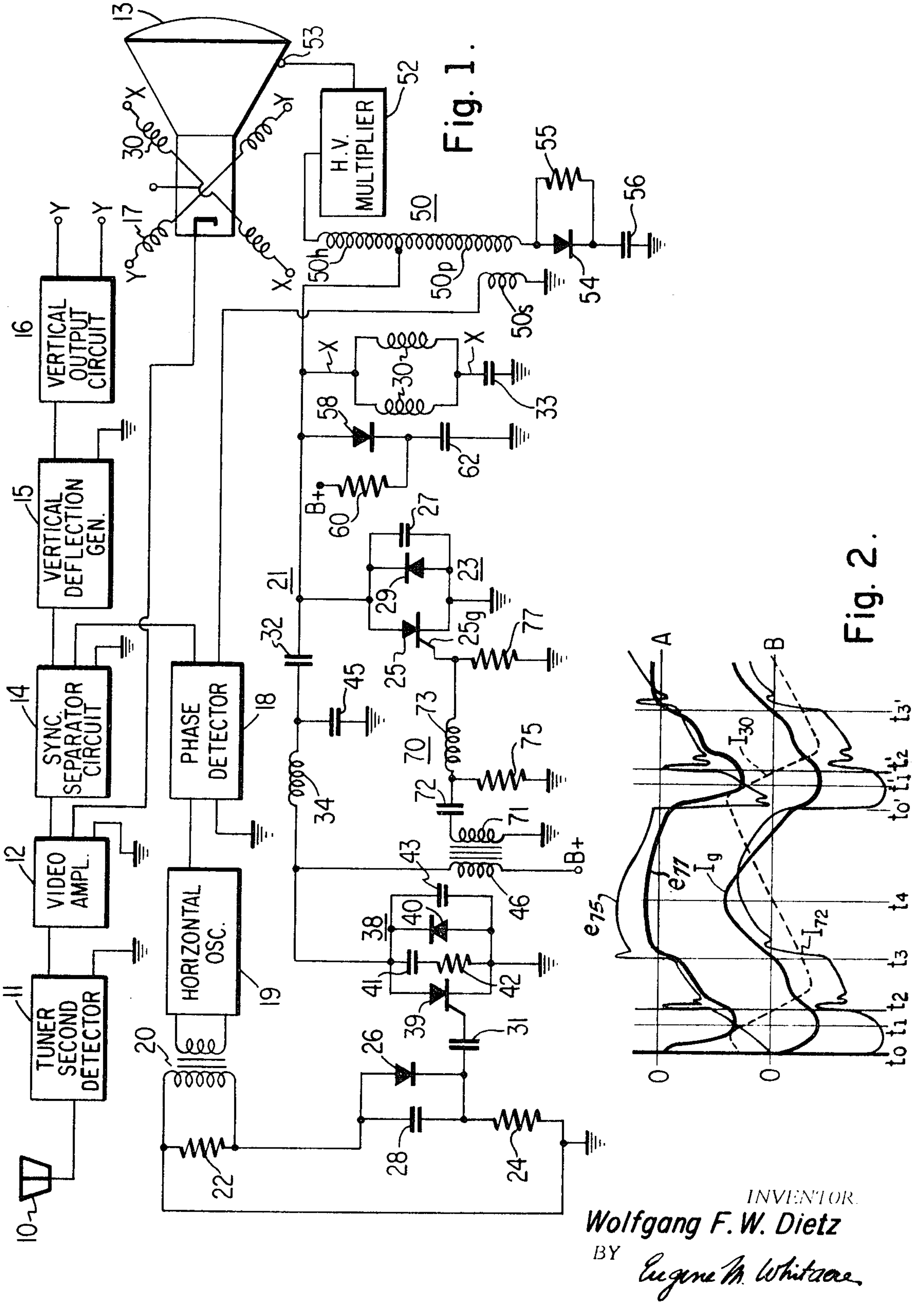

INVENTOR.
Wolfgang F. W. Dietz
BY Eugene M. Whitacre
ATTORNEY

TRIGGERING CIRCUIT FOR CRT DEFLECTION SYSTEM UTILIZING AN SCR

In a horizontal deflection circuit of the type described in my U.S. Pat. No. 3,452,244, entitled "Electron Beam Deflection and High Voltage Generation Circuit," granted June 24, 1969, and assigned to RCA Corporation, during the trace interval of each horizontal deflection cycle, deflection current is conducted by a bidirectional trace switch comprising a trace SCR (silicon controlled rectifier) coupled in parallel with a trace diode. In such a circuit, during a first portion of the trace interval, the trace SCR is off while the diode conducts to provide a current path to the horizontal deflection winding for the deflection current. During the latter portion of trace, when the current in the deflection winding reverses direction, the trace diode ceases conduction while the trace SCR conducts to provide the necessary current path. Near the midpoint of the trace interval, at the time when the current in the deflection winding reverses, it is necessary that a continuous conduction path be maintained for such current. If the conduction path is even momentarily broken, there will be an interruption in flow of current in the deflection windings and a white vertical line will be produced on the associated image display device at the center of the raster as the stationary electron beam impinges upon the phosphor screen. The present invention prevents this undesirable effect by pretriggering the gate of the trace SCR with a sufficiently positive voltage and current prior to and in the vicinity of the center of trace to insure conduction by the trace SCR and thereby prevent the occurrence of a white line.

Near the end of trace, it is desirable to provide a negative gate voltage and current to the trace SCR to make it possible to turn off the device in a relatively short time interval (e.g., 3 microseconds). It is desirable, however, to limit the negative gate voltage to prevent excessive power dissipation in the gate.

It is also particularly desirable to prevent the trace SCR from triggering during the retrace portion of each deflection cycle since, during this interval, a relatively large flyback pulse is present across the trace switch which may exceed the breakover voltage of the trace SCR and thereby produce a current which would tend to destroy the device. The present invention prevents false triggering of the trace SCR during the retrace portion of each deflection cycle by applying a negative voltage of sufficient magnitude and duration to the gate to accomplish this purpose without causing excessive power dissipation in the gate.

A circuit embodying the present invention comprises a semiconductor switching device having a control or gate element and a series resonant circuit including capacitance and inductance coupled to this control element. A source of triggering signals is coupled to the capacitance element. Means for differentiating the triggering signals is coupled from the junction of the element of the series resonant circuit and to a reference potential.

The operation of the present invention can be better understood by referring to the drawing and the accompanying description below.

In the drawing:

FIG. 1 illustrates partially in block and schematic diagram form a television receiver employing a deflection circuit including the present invention; and FIG. 2 depicts voltage and current waveforms produced by the circuit embodying the present invention.

In FIG. 1, the television receiver includes an antenna 10 which receives composite television signals and couples the received signals to a tuner-second detector 11. The tuner-second detector 11 normally includes a radio frequency amplifier for amplifying the received signals, a mixer oscillator for converting the amplified radio frequency signals to intermediate frequency signals, an intermediate frequency amplifier and a detector for deriving composite television signals from the intermediate frequency signals. The television receiver further includes a video amplifier 12.

The amplified image brightness representative portion of the composite television signal produced by video amplifier 12 is applied to the control electrode (e.g., the cathode) of a television kinescope 13. The composite television signal is also applied from video amplifier 12 to a synchronizing signal separator circuit 14. The sync separator circuit 14 supplies vertical synchronizing pulses to a vertical deflection signal generator 15. Vertical deflection signal generator 15 is connected to a vertical deflection output circuit 16, terminals Y—Y of which are connected to a vertical deflection winding 17 associated with kinescope 13.

Horizontal synchronizing pulses are derived from sync separator circuit 14 and are supplied to a phase detector 18, the latter also being supplied with a second signal related in time occurrence to the operation of a horizontal oscillator 19. An error voltage is developed in phase detector 18 and is applied to horizontal oscillator 19 to synchronize the output of the latter with the horizontal synchronizing pulses. The output developed by horizontal oscillator 19 is supplied by means of a transformer 20 and a waveshaping network including resistors 22 and 24, a diode 26 bypassed by a capacitor 28, and a coupling capacitor 31 to a horizontal deflection circuit 21 constructed to include the present invention.

The deflection circuit 21 is described in detail in U.S. Pat. No. 3,452,244. A brief description is however included here. The circuit comprises a bilaterally conductive trace switching means 23 comprising the parallel combination of an SCR 25 and a diode 29. A high frequency bypass capacitor 27 is coupled across the trace switching means 23. Trace switching means 23 couples a relatively large energy storage capacitor 33 across a horizontal deflection winding 30 during the trace portion of each deflection cycle. A first capacitor 32 and a commutating inductor 34 are coupled between trace switching means 23 and a bilaterally conductive commutating switching means 38 which comprises an SCR 39 and a diode 40. A transient suppression network including a capacitor 41 and a resistor 42 is coupled in parallel relation to the SCR 39, and a high frequency bypass capacitor 43 is coupled across diode 40. A second capacitor 45 is coupled from the junction of capacitor 32 and inductor 34 to ground. A voltage supply B+ is coupled to a relatively large supply inductor 46 which is further coupled to the junction of commutating inductor 34 and commutating switching means 38.

An output transformer 50, having a primary winding 50*p*, is coupled across the combination of horizontal winding 30 and capacitor 33. A secondary winding 50*s* is coupled to phase detector 18 for providing flyback or retrace pulses to phase detector 18 for controlling the operation of oscillator 19. A high voltage winding 50*h* provides voltage pulses to a high-voltage multiplier 52 which is further coupled to the ultor electrode 53 of kinescope 13 for providing a substantial voltage (e.g., 20–27,000 volts) for acceleration of the electron beam in kinescope 13. The low-voltage end of primary winding 50*p* is coupled to ground by means of a protection circuit including a diode 54, a resistor 55 and a capacitor 56. A second protective circuit including a clamping diode 58, a capacitor 62 and a bias resistor 60 coupled to B+ is coupled across trace switching means 23.

In accordance with the present invention, a triggering signal is provided to the gate electrode of SCR 25 by a trigger network 70. Network 70 is driven by a signal waveform appearing across a winding 71 associated with and magnetically coupled to input inductor 46. Network 70 includes a series tuned circuit which comprises a capacitor 72 and an inductor 73 coupled from winding 71 to the gate 25*g* of SCR 25. A differentiating resistor 75 is coupled from the junction of capacitor 72 and inductor 73 to ground. A second resistor 77 is coupled from the gate 25*g* of SCR 25 to ground. A better understanding of the sequence of operation can be obtained by referring to FIG. 2 in conjunction with the description that follows.

FIG. 2 illustrates voltage and current waveforms at various points in the network. Line A is the voltage zero reference while line B is the current zero reference.

For purposes of illustration, the horizontal deflection interval will be considered to be approximately 63.5 microseconds in duration with the retrace time occupying approximately 13 microseconds and the trace time the remainder of 50.5 microseconds. The midpoint of the retrace interval is illustrated as occuring occurring at time $t_2$ while the midpoint of trace occurs at time $t_4$. Commutating switch 38 conducts for the period represented by the interval from time $t_o$ in the figure to time $t_3$, except during a short interval approximately midway between $t_o$ and $t_3$. This short interval occurs during the latter half of retrace.

In operation, diode 29 conducts during the first portion of each horizontal or line trace interval to provide a path for an approximately linearly decreasing deflection current flowing in the horizontal deflection winding 30 and capacitor 33 (FIG. 2, waveform $I_{30}$ from approximately midway between $t_3$ and $t_2$ to $t_4$). When the deflection current passes through zero, SCR 25 must conduct to provide a current path for the deflection current during the second half of trace. To prepare the SCR 25 for conduction, a positive voltage (FIG. 2, waveform $e_{77}$) is applied to gate 25$g$ prior to and at the intended time of conduction $t_4$. Therefore when, at $t_4$, the anode to cathode voltage across SCR 25 is in a direction to forward bias SCR 25, SCR 25 conducts and provides a continuous conduction path for the horizontal deflection current.

As is explained in my above-identified patent, near the end of trace, (after $t_o'$), it is desirable to turn off trace SCR 25 in a relatively short period of time (e.g., 3 microseconds). Furthermore, it is desirable to prevent spurious triggering of SCR 25 during retrace when the relatively high flyback voltage pulse is impressed across switch 23. The application of a negative gate voltage of sufficient magnitude and duration has proved effective in accomplishing both of these desired results. Thus, gate 25$g$ of SCR 25 is provided with a voltage of positive polarity during a portion of trace (approximately the midportion) and of negative polarity during both a further portion of trace (the end) and at least a portion (near the middle) of retrace to effectuate proper switching of SCR 25. The desired gating signal is derived from supply inductor 46 as will be explained below.

During the latter half of the trace interval (prior to $t_o$), the current in inductor 46 is decreasing in a resonant manner as energy is supplied from inductor 46 to capacitors 32 and 45. At the same time, the voltage across inductor 46 is increasing in a resonant manner. Winding 71 and inductor 46 are magnetically coupled such that, during this time (prior to $t_o$), the voltage across winding 71 is increasingly positive. At time $t_o$ (or $t_o'$), which occurs, for example, approximately 8 microseconds before the end of the trace interval, the commutation SCR 39 is triggered into conduction by a pulse supplied by oscillator 19 via the waveshaping components 22, 24, 26, 28 and 31, thereby coupling inductor 46 between the B+ supply and substantially ground potential. The current in inductor 46, which had been gradually decreasing prior to time $t_o$, then begins to increase in an approximately linear manner. The change in current flow through inductor 46 is accompanied by a relatively abrupt change in the voltage across inductor 46 which also appears across winding 71. The voltage across winding 71, which is approximately at its positive peak at or immediately prior to $t_o$, then switches to a relatively large negative voltage. The result and voltage pulse is negative in polarity at the junction of winding 71 and capacitor 72. This voltage is differentiated by the combination of capacitor 72 and resistor 75, and the resultant voltage waveform is illustrated by the waveform of FIG. 2 having the associated symbol $e_{75}$. The voltage $e_{75}$ causes an increasingly negative current ($I_{72}$ in FIG. 2) to be supplied to capacitor 72, the current reaching a negative maximum value within the interval $t_o$ to $t_1$.

As stated above, in order to prevent spurious conduction in SCR 25, the voltage on gate 25$g$ desirably should remain negative during the retrace portion of each horizontal deflection cycle which occurs within the interval $t_1$–$t_3$ (see deflection current waveform $I_3$). This result is accomplished by utilizing the tuned circuit comprising capacitor 72 and inductor 73 to provide a gate voltage of proper phase and shape. At $t_o$, the charging current of capacitor 72 approaches its negative maximum. At the same time, due to resonant action, the current in inductor 73 is nearly zero, but is changing relatively rapidly and begins to flow in a direction through inductor 73 and a current path including resistor 77 to produce a negative voltage across resistor 77 at the gate 25$g$ of SCR 25. This last-mentioned voltage is illustrated by the waveform $e_{77}$ in FIG. 2. By time $t_1$ in FIG. 2, current in inductor 73, as well as the voltage $e_{77}$, reaches its maximum. It is noted that, within the period $t_1$ to $t_3$ (i.e., approximately at $t_2$) the voltage $e_{75}$ rises abruptly towards zero for a short period of time.

However, the integrating action of inductor 73 prevents this undesired voltage spike from reaching the gate of SCR 25 which, as voltage waveform $e_{77}$ illustrates, remains negative during retrace. It should be noted that, at this same time ($t_2$) the maximum forward anode to cathode voltage (a flyback pulse) is applied to SCR 25. Spurious triggering of SCR 25 is therefore precluded by operation of inductor 73 at this time. While it is desirable to maintain gate voltage $e_{77}$ negative during retrace to prevent spurious triggering, it is also necessary to prevent excessive power dissipation in the gate during the application of this negative voltage. The addition of resistor 75 provides a discharge path for capacitor 72 and serves to differentiate the applied voltage across winding 71 thereby making the slope of gate voltage $e_{77}$ sharper during the $t_1$–$t_3$ period than it would be absent resistor 75, thus preventing excessive power dissipation in the gate of SCR 25 during this interval. Resistor 75 also serves to produce a relatively sharply decreasing voltage ($e_{77}$) at the time $t_o$ to aid in maintaining fast turnoff of SCR 25. At time $t_3$, commutating switch 38 is opened as diode 40 opens at the end of the commutating period. The current in inductor 46 alters its slope from positive increasing to positive decreasing, thereby inducing a positive voltage from $t_3$ to $t_o'$ as differentiated voltage illustrated by waveform $e_{75}$ in FIG. 2 shows. This positive voltage charges capacitor 72 from $t_3$–$t_o'$ in a polarity opposite that of the $t_o$–$t_1$ interval. This charging current illustrated by waveform $I_{72}$ in FIG. 2 is modified by the presence of inductor 73 to provide the positive drive voltage $e_{77}$ and current $I_g$ to turn SCR 25 on at time $t_4$ during the middle of trace. The direct current resistance of inductor 73 and the capacitor 72 are selected to limit the positive gate current illustrated by waveform $I_g$ in FIG. 2 to the desired maximum. The resonant circuit comprising capacitor 72 and inductor 73 is arranged to produce a current peak substantially midway through the trace portion (i.e., at time $t_4$) and is tuned approximately to the horizontal deflection frequency to provide this desired result. Resistance 77 can be omitted if the reverse gate impedance is approximately 100 ohms or less. Further, the present invention can be utilized with a source of drive voltage differing from winding 71 associated with inductor 46. For example, capacitor 72 could be coupled directly to a tap on inductor 46.

In the preferred embodiment, the following parameter values were utilized:

| | |
|---|---|
| Capacitor 72 | 0.18 microfarad |
| Inductor 73 | 560 microhenries |
| Resistors 75 | 220 ohms |
| 77 | 470 ohms |

What is claimed is:

1. In a television receiver having a deflection system employing a semiconductor switching device including a control element, a triggering system for said control element comprising:

means for supplying a triggering waveform characterized by a first portion of a polarity suitable for rendering said switching device conductive and a second portion of opposite polarity;

a series resonant circuit comprising a capacitor coupled to said triggering waveform supplying means and an inductor coupled to said control element; and means for differentiating said triggering waveform, said differentiating means being coupled from a point of reference potential to the junction of said inductor and capacitor.

2. A circuit as defined in claim 1 and further including:

impedance means coupled from said control element of said switching device to said reference potential.

3. A circuit as defined in claim 1 wherein said means for supplying a triggering waveform comprises:

a source of a voltage waveform having positive and negative polarity portions recurring at the horizontal deflection rate.

4. A circuit as defined in claim 1 wherein said series resonant circuit is tuned to the horizontal deflection frequency for a television receiver.

5. In a television receiver having a horizontal deflection system employing a horizontal deflection winding, a source of voltage and at least one silicon controlled rectifier for coupling said winding to said source during at least a portion of the horizontal trace interval, means for triggering said rectifier comprising:

a source of signals recurring at the horizontal deflection rate, said signals being characterized by a first portion of a polarity suitable for rendering said rectifier conductive and a second portion of opposite polarity, a series resonant circuit coupled between said source and a gate electrode of said rectifier; and means coupled to said resonant circuit remote from said gate electrode for differentiating said signals.

6. A circuit as defined in claim 5 wherein said series resonant circuit includes:

a capacitor coupled to said source of signals; and an inductor coupled from said capacitor at a terminal removed from said source of signals to said gate electrode.

7. A circuit as defined in claim 6 wherein said means for differentiating said signals comprises:

resistive means coupled from the junction of said capacitor and said inductor to ground.

8. A circuit as defined in claim 7 and further including:

resistive means coupled from said gate electrode to ground.

9. A circuit as defined in claim 7 wherein:

said signals are further characterized by a segment of said first portion having an amplitude approaching zero.

10. A circuit as defined in claim 7 wherein:

said second portion occurs during the trace portion of a horizontal deflection cycle and said first portion occurs at least in part during the retrace portion of a horizontal deflection cycle.

* * * * *